350-6.4 AU 257 EX
XR 2,976,362

6

March 21, 1961 G. M. STAMPS 2,976,362

CONTINUOUS SCANNER

Filed April 12, 1956 2 Sheets-Sheet 1

INVENTOR
GEORGE M. STAMPS

BY J. B. Burke
ATTORNEY

March 21, 1961 G. M. STAMPS 2,976,362
CONTINUOUS SCANNER
Filed April 12, 1956 2 Sheets-Sheet 2
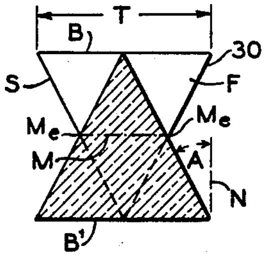
FIG.2.
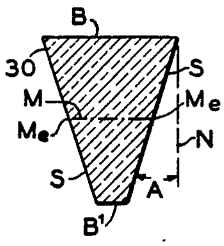
FIG.3.
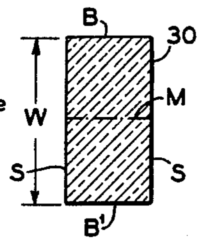
FIG.4.
FIG.17.
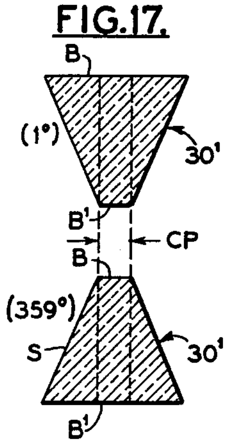
FIG.18.
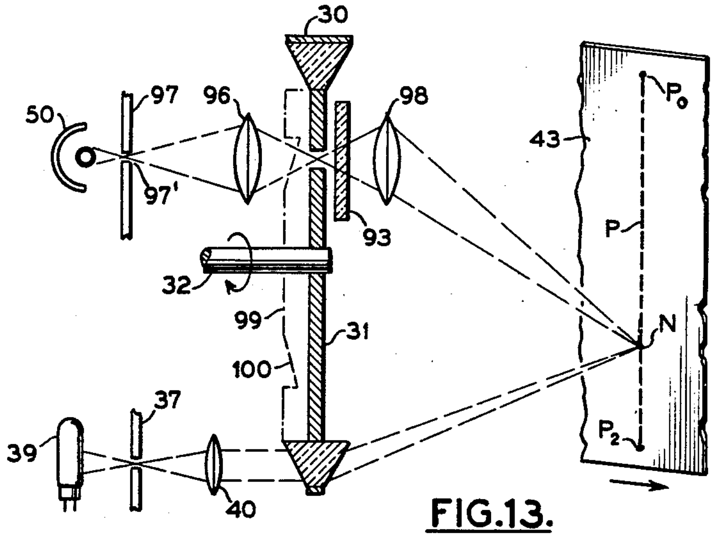
FIG.13.
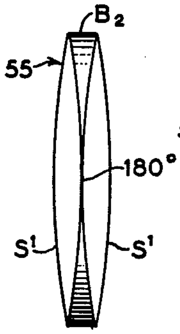
FIG.16.
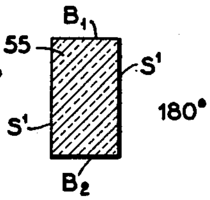
FIG.15.
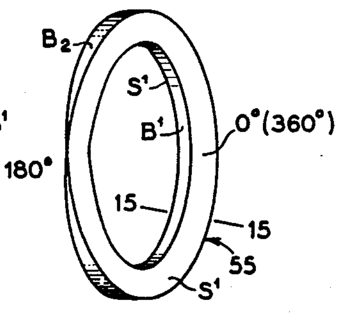
FIG.14.
INVENTOR.
GEORGE M. STAMPS
BY J. B. Burke
ATTORNEY United States Patent Office 2,976,362

Patented Mar. 21, 1961

2,976,362

CONTINUOUS SCANNER

George M. Stamps, New Hyde Park, N.Y., assignor to Faximile Inc., New York, N.Y., a corporation of Delaware Filed Apr. 12, 1956, Ser. No. 577,709

3 Claims. (Cl. 178—7.6)

This invention relates to the art of facsimile communications systems and particularly concerns novel scanning apparatus useful in such systems.

Mechanical scanning devices as heretofore known for use in high quality, facsimile communications art have generally employed rotating members which are rather difficult and expensive to manufacture. The mechanical arrangements for rotating the members are rather complex to insure vibration-free rotation. This further adds to the cost of the scanning device. The present invention is directed at providing a continuous copy scanning device which is considerably simpler in construction and less expensive to manufacture, while the scanning is accomplished with fidelity equal or superior to that which has hitherto been attainable in a facsimile transmitter or recorder.

In my copending application entitled "Continuous Scanner" filed simultaneously with this application, I disclose a scanning systems employing a warped mirror as a line sweep generating element. In the present application I disclose a scanning system employing a refractive prism having twisted sides and used as a sweep generator.

It is therefore a principal object of the invention to provide a facsimile apparatus useful in graphic copy transmission or recording, and employing a warped or twisted refractive prism as a scanner element to generate a line scanning sweep.

It is a further object to provide a device including a refractive prism, with twisted sides to generate a line scanning sweep.

It is a further object to provide a device including a disk having a spiral slit therein and carrying a warped or twisted optical refractive element for continuously scanning a line on a copy sheet.

It is a further object to provide a device of the character described with a refractive element having a spiral groove to serve as a light collector and light director.

Other and further objects and advantages of the invention will become apparent from the following description taken together with the drawing, wherein:

Fig. 1 is a perspective view of an optical refractive prism according to the invention.

Figs. 2, 3 and 4 are sectional views taken on lines 2—2, 3—3 and 4—4 respectively of Fig. 1.

Fig. 13 is a diagram of a copy scanning apparatus embodying the device of Fig. 12.

Fig. 14 is a perspective view of an optical refraction element.

Fig. 15 is a sectional view taken on line 15—15 of Fig. 14.

Fig. 16 is an end elevational view of the element of Fig. 14.

Figs. 17, 18 are cross sectional views of a modified form of prism.

Figures 1, 5, 6, 7, 8, 9, 10, 11, 11A, 12:
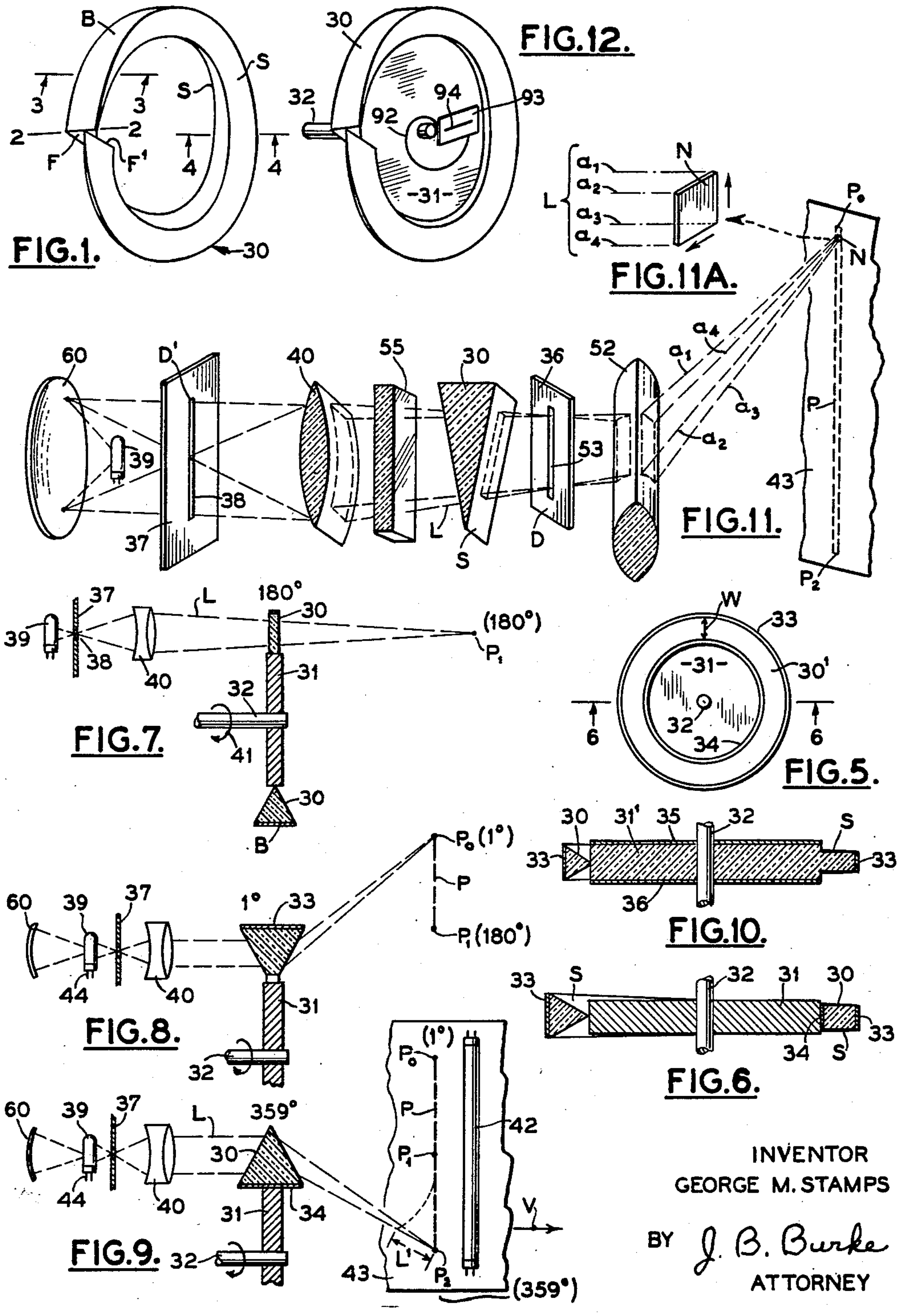
Fig. 5 is a plan view of a scanning disk carrying a refractive prism according to the invention.
Fig. 6 is a sectional view taken on lines 6—6 of Fig. 5.
Figs. 7, 8, 9 are diagrams of a scanning device illustrating a mode of operation of the invention.
Fig. 10 is a sectional view corresponding to Fig. 6 showing a modified form of scanning disk.
Fig. 11 is an oblique view of a scanning apparatus embodying the invention.
Fig. 11A shows on an enlarged scale a portion of the optical path of Fig. 11.
Fig. 12 shows a scanning device including a disk having a circumferential prism thereon and a spiral slit centrally disposed in the disk.

In Figs. 1, 2 and 3 is shown a circular, generally toroidal, transparent refracting prism 30 useful in a sweep generating device. The element is made of optically transparent or transmitting material such as glass or clear plastic. The prism has a quadrilateral (usually trapezoidal) cross section at all points intermediate between the end faces F, F′ located at 0° (or 360°) where the faces are in abutment. The end faces are substantially triangular and are the limiting forms of the varying trapezoidal cross section of the prism. The sides S of the prism vary smoothly in inclination angle A throughout the circumferential length of the prism. Angle A is maximum at 0° to 1° and 359° to 360° and is zero at 180° where sides S are parallel to each other as shown in Fig. 4. This cross section is not by definition a trapezoid but a rectangle which represents the transition point between trapezoidal sections having oppositely inclined sides. Base B thus varies in width from T to 0 while base B′ varies from 0 to T, where T is the maximum thickness of the prism. The width of the prism at midsection M is preferably constant throughout its length. Thus sides S may be regarded as pivoting in opposite angular directions at the points $M_e$ of the midsection or throughout the length of the prism. A discontinuity occurs at or near 0° (or 360°) where the triangular faces F, F′ are in abutment. The prism 30 is thus a generally toroidal element having two twisted sides S. Each side has its ends defining edges of the faces F and F′. These ends or edges intersect at their midpoints and are disposed at acute angles to each other where they are closest to each other.

A sweep generating device employing prism 30 is shown in Figs. 5, 6. Prism 30 is mounted on an opaque disk 31 having a central shaft 32 for rotation of the disk and prism. An opaque film or coating 33 on the exterior of the prism serves to prevent entry of light through the base B. A similar coating 34 may be placed on exposed portions of base B′. The disk itself may be made of glass or plastic as shown by disk 31′ in Fig. 10. Opaque coatings 35, 36 are applied to each face of the disk 31′. Prism 30 is fabricated around the perimeter of the disk 31′.

In Figs. 7, 8, 9 is shown how the device may be used to generate an optical sweep of a line to be scanned. Lamp 39 illuminates aperture 38 in an opaque plate 37. Lens 40 images the aperture at the spot or point $P_1$. Prism 30 intercepts the optical path from the lamp to the point $P_1$. The region of optical path intercept as shaft 32 and prism 30 rotate, is the width W (Fig. 4) of the prism. At the point where the prism is parallel sided (Figs. 4, 7), the light beam L, is not deflected. The prism extends the location of the region of focus P, by a distance $(n-1)M$ where $n$=index of refraction of the prism and M is the thickness of the prism.

In Fig. 7, the position of the prism where beam L is intercepted is 180° from the reference plane 0° taken as the plane of face F. In Fig. 8, the prism position is 1° from the reference plane and in Fig. 9 the prism position is 359° from the reference plane.

Since the cross section of prism 30 is generally trapezoidal the light beam is refracted up to point $P_0$ (1°) from point $P_1$ (180°) as shown in Fig. 8. The thickness T of the prism at 1° is greater than M at 180° to compensate for the increase in distance from the prism to $P_0$; the value of $(n-1)M$ is greater, so that $P_0$ lies on the straight line P with $P_1$. At the 359° prism position of Fig. 9 the beam is refracted down to $P_2$ the same distance as it was refracted up at $P_0$. Thus in a 360° rotation of disk 31, spots or points $P_0$—$P_1$—$P_2$ trace the line P which is scanned because the cross-section of the prism varies continuously between faces F, F'. If the prism is rotated as indicated by arrow 41 at a constant rate the motion of the image of the aperture on the scanned line P will move at a constant rate because the inclination of the sides of the prism varies uniformly throughout. This type of scanning device produces an exactly repetitive scan without scanning spot vibration or "jitter." Copy sheet 43 may be provided upon which line P is a scanned line. The sheet may be movable in direction V so that line P is disposed transversely to the direction V. Thus the sheet will be scanned repetitively line by line as disk 31 rotates. If lamp 39 emits light modulated in accordance with graphic signals applied as pulses to conductors 44, and if sheet 43 is photosensitive, then the device constitutes a facsimile photo-recorder.

If lamp 39 is a phototube sensitive to received light pulses, and the line P on a graphic copy sheet 43 is flood illuminated by a lamp 42, a scanning apparatus results, for transmission of electrical signals representing the graphic copy. These signals appear at terminals 44 of the phototube and may be applied to an electrical transmission system as well known in the art. A monochromatic system may be used to improve resolution where dispersion by the prism 30 is a problem. By providing a lamp 42 which emits primarily monochromatic light such as a green light, and by providing a phototube 39 responsive principally to this monochromatic light, a monochromatic system may be obtained in which the light dispersing effects of the prism are minimized. If lamp 39 emits a constant amplitude of light, a pickup phototube may be used to receive light reflected from scanned line P of graphic copy sheet 43 so that a spot illumination scanner results. Lamp 42 would not be required for this use of the scanning device. A curved reflector 60 may be placed behind lamp 39 if desired.

The matter of resolution must be considered for the scanning devices employing the prism scanning member 30. Consider a scanner required to resolve 1000 elements per sweep of the scanned line P. Then for a ten-inch diameter disk 31 and a prism length of about thirty inches, the region of the prism transmitting light would be .03 inch or about 1/32 inch wide in the direction 41 of disk motion. This region might be an inch wide, so that the light transmission area would be about .03 square inch. To define this slit-like region at the prism 30 a cylinder lens system or a slit-aperture or both should be located close to the prism. If a plate having a slit 1" x .03" is placed in front of the prism, light can pass only through the proper region of the prism. While this reduces the intensity of light passing the prism, this is compensated for by using a stronger light source 39 or 42.

Fig. 11 shows a suitable optical system for a prism scanner as described. A horizontal cylinder lens 52 forms a horizontal line image of the square elemental scan area N on slit 53 in an opaque plate 36. The optical path through the plate 36 is thus slit-like with the smaller dimension D of slit 53 disposed in the vertical paper feed direction and lying circumferentially on the prism while its long dimension is disposed radially on the prism. This arrangement produces the optical path with .03 inch cross section mentioned in the example above. A transparent flat plastic or plate glass member may be provided in the optical path. This member is a ring of varying thickness which rotates with prism 30 and serves by double refraction to compensate for the extra optical path length at the ends $P_0$ and $P_2$ of the scan stroke. A vertically disposed cylindrical lens 40 forms a vertical image at slit 38 of the elemental scan area. Slit 38 is a slit in plate 37. The narrow dimension D' of the slit 38 lies in the horizontal sweep direction of aperture N on line P. The prism 30 bends the optical path whose limits are the rays $A_1$, $A_2$, $A_3$, and $A_4$. As the prism rotates the angle of inclination of the sides S of the prism changes and the elemental scan area N sweeps along line P repeatedly.

At all points of its sweep the dimensions of the image 58 of the elemental scan aperture at the lamp or phototube 39 are defined by the two slit apertures or images 38 and 53. The sweep direction aperture 38 defines the sweep direction dimension of the elemental scan aperture N. The feed direction aperture 53 defines the copy feed direction dimension of the elemental scan aperture. Although the prism bends the optical path, the slits are each parallel to the axis of the particular cylinder lens which converges light to it. In this way distortion of the images is kept to a minimum. Fig. 11A shows the general shape and orientation of spot N and light beam L on an enlarged scale.

The plate glas ring 55 may be provided if desired for very fine correction to preserve the focus of lens 52 on sheet 43 at the ends of the scanning sweep. This ring may be a generally toroidal element. As shown in Figs. 14, 15, 16 it has sides S' which vary continuously in thickness throughout. The ring is thickest at the 0° (360°) point and thinnest at the 180° point. The cross-section of the ring 55 at all points is a rectangle as shown in Fig. 15 with the inner and outer surfaces $B_1$, $B_2$ perpendicular to sides S'.

Instead of using a separate ring corrector for prism 30, it is possible to embody the correction feature in the prism by increasing the thickness of the prism at all points, by the corresponding thickness of ring 55. Thus the 1° point of such a corrected prism 30' as shown in Fig. 17 is increased by the addition of the correction thickness CP. At 359° the prism 30' is similarly increased by thickness CP as shown in Fig. 18. At the 180° point the cross-section would not be increased, so that Fig. 4 will suffice as a showing of the cross section of both prisms 30 and 30' at the 180° point. Figs. 17 and 18 correspond to solid line and sectional portions respectively of Fig. 2 with the several portions of the prism increased in width by thickness CP.

Fig. 12 shows an optical scanning assembly employed in a modification of the invention. This assembly includes a spiral slit 92 in the opaque disk 31. An opaque plate 93 is disposed near the disk 31 and has a linear slit 94. This arrangement of a spiral slit in association with a linear slit for a facsimile scanner is disclosed in my copending application 291,144, filed June 2, 1952. To the disk 31 is attached the prism 30 as disclosed herein.

In Fig. 13 is shown a scanning system employing the assembly of Fig. 12. Lamp 39 projects a light beam through the aperture in plate 37, lens 40, and prism 30. The beam is focused as a spot N on copy sheet 43. As the disk and prism rotate on shaft 32, the scan line P is illuminated by the moving spot or area of light N. From the moving area N the reflected light is transmitted through lens 98 which focuses line P on disk 31 at the intersection of linear slit 94 and spiral slit 92. The rotating spiral slit and intersecting stationary slit 94 define a moving aperture which scans line P simultaneously with the illumination thereof by the light beam refracted by prism 30. In order that this may be accomplished precisely in a single rotation of the disk and prism, the plane of the widest and narrowest portions of the outer side of the prism are disposed in a diametral plane of the disk including opposite ends of a single turn of the spiral slit 92 as clearly shown in Fig. 12. The copy sheet 43 may be moved in a path disposed transversely to the direction of line P so that successive lines on sheet 43 are scanned. The path of copy movement may be disposed angularly with respect to the disk 31 to avoid specular reflection thereon. From disk 31, the reflected scanned line P is focused by objective lens 96 through aperture 97' in plate 97 to photocell 50.

In my copending application 419,747, filed March 30, 1954, I disclosed an improved scanning element which may be a round disk of transparent material. The disk has an opaque film layer attached to one side thereof. In the film is a spiral window or slit. This slit may be a spiral of dots, or the transparency of the slit may vary sinusoidally. In registration with the spiral is a groove which is cut or formed in the free side of the disk. The angle of inclination of the bottom of the groove varies continuously. It was disclosed that this scanning member may serve simultaneously as light director, light chopper, and line scanner. If the outer edge of such a disk is formed as a refractive prism such as prisms 30 or 30' as disclosed herein, the resulting scanning element may be used in an optical system such as that of Fig. 13 to embody in one element the characteristics of a light refractor, light director, light chopper and line scanner. The dotted line 99 in Fig. 13 represents schematically the addition to disk 31 of such a transparent disk with the spiral groove 100 therein. The spiral slit 92 is disposed in registration with the center of the inclined bottom of the groove. When such a light director is used, the objective lens 96 may be omitted from the system of Fig. 13.

What is claimed is:

1. A scanning device, comprising a flat faced rotatable opaque circular disk, a ring-like prism mounted on the periphery of said disk, said prism having at least one side inclined and continuously twisted from end to end thereof with respect to the plane faces of the disk, said disk having a transparent spiral slit therein, a lens, a graphic copy medium, a light source disposed at one end of an optical path including said prism, copy medium, lens and disk in sequence, said prism projecting a moving spot of light on a single line of said copy medium for reflection therefrom, said lens focusing the reflected line on said disk for repeated scanning by said slit and light responsive means at the other end of said path for receiving light reflected from said line.

2. A facsimile scanning device, comprising a flat faced rotatable opaque circular disk, a ring-like prism mounted on the periphery of said disk, said prism having at least one side inclined and continuously twisted from end to end thereof with respect to the plane faces of the disk, said disk having a transparent spiral slit therein, a stationary opaque member having a straight slit disposed adjacent to said spiral slit to define a moving aperture therewith during rotation of said disk, a lens, a light reflecting copy medium, a light source disposed at an end of an optical path including said prism, copy medium, lens and aperture in sequence, said prism projecting a moving spot of light on a single line of said copy medium for reflection therefrom, said lens focusing the reflected line on said disk for repeated scanning by said aperture, a photocell disposed at the other end of said optical path, and lens means disposed in said path and focusing the line scanned by said aperture on said photocell, said copy medium being movable in a path transverse to said line that successive lines on said medium are scanned by said aperture.

3. A facsimile scanning device, comprising a flat faced rotatable opaque circular disk, a ring-like prism mounted on the periphery of said disk, said prism having at least one side inclined and continuously twisted from end to end thereof with respect to the plane faces of the disk, said disk having a transparent spiral slit therein, a stationary opaque member having a straight slit disposed adjacent to said spiral slit to define a moving aperture therewith during rotation of said disk, a lens, a light reflecting copy medium, a light source disposed at an end of an optical path including said prism, copy medium, lens and aperture in sequence, said prism projecting a moving spot of light on a single line of said copy medium for reflection therefrom, said lens focusing the reflected line on said disk for repeated scanning by said aperture, a photocell disposed at the other end of said optical path, and lens means disposed in said path and focusing the line scanned by said aperture on said photocell, said copy medium being movable in a path transverse to said line that successive lines on said medium are scanned by said aperture, said lens means comprising a transparent disk juxtaposed to said opaque disk and having a spiral groove therein in registration with said slit, said groove having a bottom varying continuously in inclination with respect to the plane faces of the opaque disk.

References Cited in the file of this patent

UNITED STATES PATENTS

| | | |
|---|---|---|
| 1,385,325 | Jenkins | July 19, 1921 |
| 1,695,924 | Kintner | Dec. 18, 1928 |
| 1,790,491 | Smith | Jan. 27, 1931 |
| 2,227,011 | Schlesinger | Dec. 31, 1940 |
| 2,285,593 | Lemert | June 9, 1942 |